United States Patent
Pohlmann et al.

(10) Patent No.: US 8,167,691 B2
(45) Date of Patent: May 1, 2012

(54) CROP RESIDUE CHOPPING AND DISTRIBUTING ARRANGEMENT FOR A COMBINE HARVESTER

(75) Inventors: Norbert Pohlmann, Zweibrücken (DE); Friedrich K Lauer, Krähenberg (DE); Dirk Weichholdt, Woelfling les Sarreguemines (FR); Rico Priesnitz, Lebach (DE); Oliver Klein, Saarlouis (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/778,715

(22) Filed: May 12, 2010

(65) Prior Publication Data

US 2010/0291985 A1 Nov. 18, 2010

(30) Foreign Application Priority Data

May 14, 2009 (DE) .......................... 10 2009 003 124

(51) Int. Cl.
*A01F 12/40* (2006.01)

(52) U.S. Cl. .................................... 460/112

(58) Field of Classification Search ...... 460/8, 111–113, 460/901
See application file for complete search history.

(56) References Cited

U.S. PATENT DOCUMENTS

| | | | |
|---|---|---|---|
| 6,736,721 B2 * | 5/2004 | Niermann et al. | 460/112 |
| 7,086,942 B2 * | 8/2006 | Niermann et al. | 460/111 |
| 7,186,179 B1 * | 3/2007 | Anderson et al. | 460/111 |
| 7,390,253 B2 * | 6/2008 | Farley et al. | 460/111 |
| 7,487,024 B2 * | 2/2009 | Farley et al. | 701/50 |
| 7,553,227 B2 * | 6/2009 | Landuyt | 460/111 |
| 2007/0015556 A1 | 1/2007 | Johnson et al. | |
| 2009/0325659 A1 * | 12/2009 | Overschelde et al. | 460/112 |
| 2010/0120482 A1 * | 5/2010 | Holmen | 460/112 |
| 2010/0248802 A1 * | 9/2010 | Lauer et al. | 460/112 |
| 2011/0053668 A1 * | 3/2011 | Weichholdt et al. | 460/112 |

FOREIGN PATENT DOCUMENTS

| | | |
|---|---|---|
| DE | 102008040129 A1 | 3/2009 |
| EP | 0631717 A1 | 1/1995 |
| EP | 1269822 A1 * | 1/2003 |
| EP | 1514466 A2 | 3/2005 |
| EP | 1532858 A1 | 5/2005 |

OTHER PUBLICATIONS

European Search Report received Aug. 9, 2010 (8 pages).

* cited by examiner

*Primary Examiner* — Thomas Will
*Assistant Examiner* — Joan Misa

(57) ABSTRACT

In a crop residue chopping and distributing arrangement for a combine harvester (10) with a straw chopper (60) and two discharge blowers (100), a guide element (150) distributes the crop residue stream over the two discharge blowers (100) is arranged between said blowers. Passages (162) remain between the guide element (150) and the discharge blowers (100) such that the crop residues can be rearwardly discharged onto the field by the straw chopper (60) through said passages. Outer guide elements (141) are provided between the straw chopper (60) and the discharge blowers (100) in order to deflect the outer regions of the crop residue stream inward. The straw chopper housing (19) may feature a curved bottom (112) that axially conveys the crop residues to the discharge blowers (100) at an angle, wherein a flat crop residue guide element (112) is arranged between the straw chopper housing (90) and the discharge blowers (100).

12 Claims, 8 Drawing Sheets

CROP RESIDUE CHOPPING AND DISTRIBUTING ARRANGEMENT FOR A COMBINE HARVESTER

FIELD OF THE INVENTION

The invention pertains to a crop residue chopping and distributing arrangement for a combine harvester.

BACKGROUND OF THE INVENTION

Agricultural combine harvesters are large machines that harvest, thresh, separate and clean agriculturally cultivated grain-bearing crops. The obtained clean grain is stored in a grain tank arranged on the combine harvester. The threshed straw is usually either chopped and distributed on the field over the width of the cutting unit or conveyed around the straw chopper and deposited on the field in non-chopped form in a windrow in order to be subsequently picked up by a baler. The crop residues ejected out of the rear outlet of the cleaning device such as chaff and small straw particles are distributed on the field by a chaff spreader or conveyed through the straw chopper and distributed on the field.

DE 199 08 111 C1 describes a combine harvester with a straw chopper and two discharge blowers that are arranged laterally adjacent to one another downstream of the straw chopper in order to widely distribute the straw over the field. The outlet of the straw chopper and the inlet of the discharge blowers that are arranged in a housing and feature discharge paddles rotating about an approximately vertical axis are arranged in one plane for the purpose of a material transfer without a change in direction. Casings arranged around the discharge blowers converge in a front point that faces the straw chopper between the discharge blowers. The casings contain cutouts in the rear region in order to deposit the straw on the field. The front sides of the discharge blowers rotate inwardly sides and extend laterally over the straw chopper. The rotational axes are respectively situated in the vicinity of an outer end of the straw chopper. Similar arrangements can also be found in EP 1 269 822 A1, EP 1 277 387 A1, EP 1 514 466 A2 and EP 1 532 858 A1.

This prior art has various disadvantages. The discharge blowers of DE 199 08 111 C1 are relatively large and extends laterally over the straw chopper. This provides the advantage that the discharge blowers receive relatively few crop residues to be initially transported forward in their outer, forwardly rotating regions such that the energy requirement of the discharge blowers remains relatively low, yet large discharge blowers of this type are relatively bulky and elaborate. In contrast to this, the discharge blowers of EP 1 269 822 A1, EP 1 277 387 A1, EP 1 514 466 A2 and EP 1 532 858 A1 have a slightly smaller diameter, yet this has the aforementioned disadvantage that the outer regions of the discharge blowers need to deflect the crop residues impacting at this location by approximately 180° and this deflection is quite energy-consuming. EP 2 036 422 A2 describes a combine harvester with a straw chopper and straw guide plates arranged behind the straw chopper, wherein the crop residue stream is constricted in the lateral direction downstream of the straw chopper such that the straw discharging distance becomes less dependent on the distribution of the crop residues along the shaft of the straw chopper.

US 2007/0015556 A1 describes a combine harvester with a straw chopper, in which the outlet of the straw chopper acts upon the downstream discharge blowers on their periphery from below, namely at an acute angle. WO 2008/156419 A1 describes a similar arrangement of a straw chopper and discharge blowers, but the crop stream is deflected downstream of the straw chopper by means of a plate such that it impacts on the discharge blower in the axial direction, however, at a relatively acute angle. In this case, the central part of the crop residue stream is not deflected as significantly as the outer part such that the speed of the crop residues to be distributed after the discharge from the straw chopper is utilized to the greatest extent possible, namely by acting upon the discharge blowers that rotate inward with their front sides with the outer part of the crop residue stream in front of the rotational axis and throwing the central part of the crop residue stream against the discharge blower rearward of the rotational axis. In this case, it is considered disadvantageous that the deflection of the crop residue stream downstream of the straw chopper leads to friction and therefore energy losses, namely even in the inner regions, in which a relatively small deflection of the crop residue stream takes place.

SUMMARY OF THE INVENTION

In accordance with one aspect of the invention, a crop residue chopping and distributing arrangement for a combine harvester with a straw chopper and two discharge blowers arranged downstream of the straw chopper, wherein said crop residue chopping and distributing arrangement does not exhibit at least one of the aforementioned disadvantages at all or to a lesser extent only.

The crop residue chopping and distributing arrangement for a combine harvester may feature a straw chopper and two discharge blowers that are arranged downstream of the straw chopper in reference to the material transport direction. In the harvesting mode, the straw chopper may chop up crop residues supplied thereto, particularly straw. The straw chopper may also transport other crop residues such as, for example, chaff with its knives and, if applicable, additional conveyor paddles, namely together with the straw in the chopping mode or alternatively only these crop residues in a straw windrow depositing mode, in which the straw is conveyed past the straw chopper. The crop residues supplied by the straw chopper may be received by the two discharge blowers and distributed over the field. To this end, the discharge blowers may rotate in opposite directions, wherein the regions of the discharge blowers that face the straw chopper rotate toward one another. If viewed from the top, the left discharge blower, in reference to the forward direction, may rotate in the clockwise direction while the right discharge blower, in reference to the forward direction, rotates in the counterclockwise direction. A guide element may be arranged between the discharge blowers in order to guide the crop residue stream in the region between the discharge blowers. Respective passages may remain in the lateral direction between the guide element and the discharge blowers, wherein a crop residue stream delivered from the central region of the straw chopper may extend rearward from the straw chopper onto the field, if applicable, after it is deflected in the lateral direction by a movable guide element.

The guide element may feature a front point that is arranged directly adjacent to the straw chopper and preferably adjoins the enveloping circle of the chopping knives directly, i.e., its shape is adapted to the enveloping circle of the chopping knives. Undesirable crop residue accumulations on the point may be prevented because the point of the guide element is very closely adapted to the enveloping circle of the chopping knives, preferably with such a small gap that the chopping knives remove crop residues from the point. The guide element may divide the crop residue stream into two halves and respectively feeds these halves to one of the discharge blowers as described in DE 199 08 111 C1.

The guide element may extend behind the rotational axes of the discharge blowers and its rear end may be adjoined by the aforementioned movable guide element that is continuously moved about an axis extending parallel to the rotational axis of the discharge blowers by a suitable drive during the operation.

In one preferred embodiment of the invention, the straw chopper may be arranged within a straw chopper housing and the discharge blowers are arranged within a discharge blower housing. Since the point extends into the straw chopper housing while the actual guide element is situated in the discharge blower housing, the guide element may be assembled of two parts. The front part of the guide element that features the point may be fixed on a crop residue guide element that forms part of the straw chopper housing or is connected thereto. A rear part of the guide element may be fixed on the discharge blower housing. In order to join both parts in an unproblematic fashion, the rear side of the front part may be provided with a slot, into which the rear part extends. This will help prevent the formation of protruding edges, on which crop residues could accumulate.

The discharge blowers may be arranged within partial casings, in which gaps are provided adjacent to the guide element such that part of the crop residue stream discharged by the discharge blowers may be guided rearward by the guide element and deposited on the field near the center of the combine harvester.

Outer guide elements may be provided between the straw chopper and the discharge blowers, the rotational axes of which are arranged within the width of the straw chopper, in order to deflect outer regions of the crop residue stream laterally inward. Consequently, the discharge blowers may be acted upon by crop residues to a lesser extent in their outer regions that rotate opposite to the forward direction, to reduce the energy requirement of the discharge blowers. This measure is particularly preferred if the entire discharge blowers are situated within the width of the straw chopper although edge regions of the discharge blowers may extend laterally outside the width of the straw chopper.

The guide elements are arranged, in particular, on a lateral wall of the straw chopper housing or a side wall extension connected thereto.

The scope of the invention includes different options with respect to the relative arrangement between the straw chopper and the discharge blowers. For example, the straw chopper may act upon the discharge blower in the exact radial direction (see DE 199 08 111 C1) or upon the radially outer edge of the discharge blower at an acute or obtuse angle (see US 2007/0015556 A1) or the crop residues may be fed to the discharge blower in the axial direction at an acute or obtuse angle, namely with a deflection (see WO 2008/156419 A1) or without a deflection (see DE 10 2007 037 485 B3) of the crop residues downstream of the straw chopper by means of a deflection element.

When acting upon the discharge blowers axially, the system may deflect the crop residue stream to the discharge blowers at a greater angle in reference to the rotational axis in a central region than in outer regions. In other words, the system may be arranged such that the crop residue stream in the central region impacts on the paddles of the discharge blower at a relatively flat angle in reference to the radius of the discharge blower. Consequently, the speed of the crop residues generated by the straw chopper is better utilized in the central region and an increased discharging distance is achieved while the crop residue stream impacts on the discharge blowers at small angles in reference to the rotational axis in the outer regions (i.e., the crop residue stream impacts on the paddles of the discharge blower at a steeper angle in reference to the radius of the discharge blower than in the central region) such that they only realize a deflection of less than 180° and the energy balance of the discharge blowers is additionally improved.

The aforementioned angles may also be provided by baffle plates as described in WO 2008/156419 A1. These baffle plates, however, are subject to the initially cited disadvantages. A flat crop residue guide element may be arranged between a concavely curved bottom of the straw chopper housing and the discharge blowers. The ejecting direction of the straw chopper therefore may be defined by the bottom only, while the crop residue guide element may only serve for guiding the crop residue stream to the discharge blowers, but not for carrying out a deflecting function that is associated with disadvantageous friction.

In reference to the forward direction, the crop residue stream is introduced in front of the rotational axes of the discharge blowers, wherein a different deflection is not realized in an outer and an inner region.

BRIEF DESCRIPTION OF THE DRAWINGS

An exemplary embodiment of the invention is described below with reference to the drawings.

DETAILED DESCRIPTION OF THE PREFERRED EMBODIMENT

In this document, "front", "forward", "in front of", and similar terms refer to the direction of movement of the vehicle when it travels through the field in a straight line harvesting crop. "Rear", "rearward", "behind", and similar terms refer to the opposite direction. "Lateral", "laterally", and similar terms refer to a direction that is perpendicular to the above direction of movement and is generally horizontal.

Figure 1:
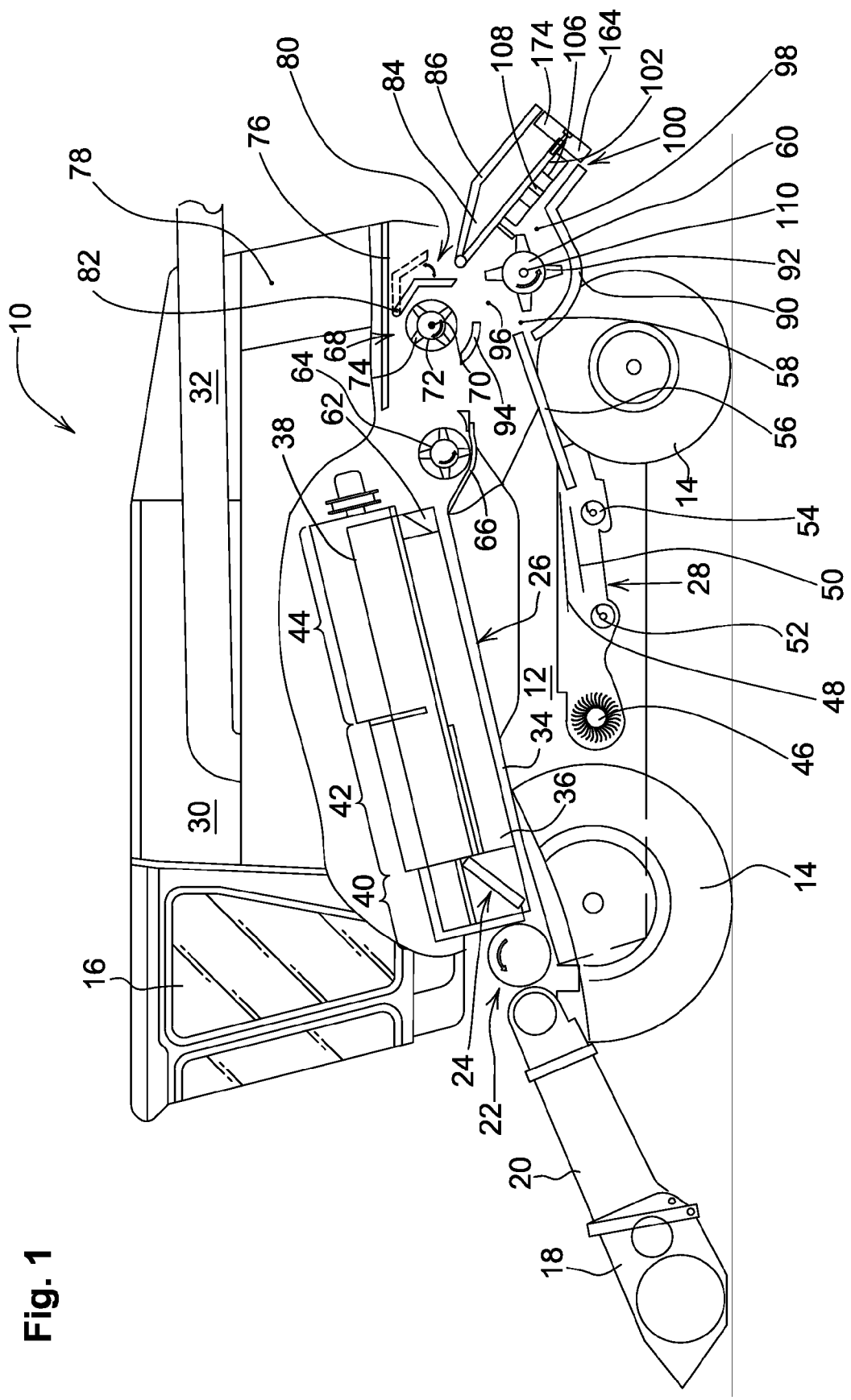
FIG. 1 shows a partially sectioned side view of a combine harvester with a straw chopper and discharge blowers.

FIG. 1 shows an agricultural combine harvester 10 with an undercarriage 12 with wheels 14 that are in contact with the ground, wherein said wheels are fixed on the undercarriage 12 and serve for propelling the combine harvester 10 in a forward direction that extends toward the left in FIG. 1. The operation of the combine harvester 10 is controlled from the operator's cabin 16. A cutting unit 18 is used for harvesting the grain-bearing crop and feeding the harvested crop to a slope conveyor 20. The harvested crop is fed to a guide drum 22 by the slope conveyor 20. The guide drum 22 guides the crop to an axial crop processing device 26 through an inlet transition section 24. In the following description, directional indications such as front and rear refer to the forward direction of the combine harvester 10 that extends toward the left in FIG. 1.

The crop processing device 26 features a rotor housing 34 and a rotor 36 arranged therein. The rotor 36 features a hollow drum 38, on which processing elements for a feeding section 40, a threshing section 42 and a separating section 44 are fixed. The feeding section 40 is arranged on the front side of the axial crop processing device 26. The threshing section 42 and the separating section 44 lie downstream and toward the rear of the feeding section 40 in reference to the longitudinal direction. The drum 38 has the shape of a truncated cone in the feeding section 40. The threshing section 42 features a front section in the shape of a truncated cone and a cylindrical rear section. The cylindrical separating section 44 of the drum 38 is situated at the end of the axial crop processing unit 26. Instead of an axial crop processing unit 26, it is also possible to use a conventional threshing drum and an axial separating device arranged downstream of the threshing drum or straw rockers arranged downstream of the threshing drum.

Grain and chaff dropping through a threshing basket assigned to the threshing section 42 and a separating grate assigned to the separating section 44 are fed to a cleaning system 28 with a blower 46 and lamellar screens 48, 50 that are moved with an oscillatory motion. The cleaning system 28 removes the chaff and feeds the clean grain to an elevator (not-shown) for clean grain by means of a screw conveyor 52. The elevator for clean grain deposits the clean grain in a grain tank 30. The clean grain in the grain tank 30 can be unloaded on a grain vehicle, a trailer or a truck by means of an unloading screw conveyor 32. Any parts of the crop that remain at the rear end of the lower lamellar screen 50 are once again fed to the crop processing device 26 by means of a screw conveyor 54 and a tailings conveyor (not-shown). Crop residues that are delivered at the rear end of the upper lamellar screen 48 and essentially consist of chaff (chaff) and small straw particles are transported rearward into the inlet 58 of a straw chopper 60 by means of an oscillating bottom conveyor 56.

Threshed straw exiting the separating section 44 is ejected from the crop processing device 26 through an outlet 62 and fed to an ejecting drum 64. The ejecting drum 64 that cooperates with a bottom 66 arranged thereunder ejects the straw rearward. Another conveyor in the form of an overshot drum conveyor 68 is situated rearward of the ejecting drum 64 and approximately at the vertical height of its rotational axis. The drum conveyor 68 extends horizontally and transverse to the forward direction and can be set in rotation about its axis 70, by means of which it is rotatably mounted on the undercarriage 12, with the aid of a suitable drive, namely in a rotating direction, in which it operates in an overshot fashion and turns in the clockwise direction in FIG. 1 as indicated by an arrow. A hydraulic motor is typically used for driving the drum conveyor 68. With respect to its design, the drum conveyor 68 corresponds to the ejecting drum 64 and features a rotationally symmetrical drum 72 with circumferentially distributed drivers 74 rigidly arranged thereon. A trough 94 is arranged underneath the drum conveyor 68.

An upper wall 76 that extends horizontally and in the forward direction is arranged above the ejecting drum 64 and the drum conveyor 68 and forms the bottom wall of an engine compartment 78 situated on top thereof. A flap 80 is hinged to the wall 76 on its front end that is situated adjacent to the drum conveyor 68 such that it can be pivoted between a windrow depositing position and a chopping position about an axis 82 that extends horizontally and transverse to the forward direction. The flap 80 in itself is concavely curved, wherein the radius is adapted to the drum conveyor 68.

A plate 84 is rigidly connected to the undercarriage 12 and situated adjacent to the flap 80 underneath its lower and rear end (when the flap 80 is in the chopping position) without forming a gap, wherein said plate extends obliquely rearward and downward and is connected to a chute 86, on which the straw can slide down onto the field in the windrow depositing mode. The straw windrow can also be arranged in a desired shape by means of guide skids or straw guide rakes (not-shown) arranged on the upper side of the chute 86.

The flap 80 can be pivoted about the axis 82 between the chopping position, in which it is illustrated with continuous lines in FIG. 1, and a windrow depositing position, in which the flap 80 is illustrated with broken lines in FIG. 1 and extends rearward above the straw stream.

The straw chopper 60 is situated underneath the plate 84, wherein this straw chopper is composed of a straw chopper housing 90 and a rotor 92 that is arranged therein and rotatable about an axis that extends horizontally and transverse to the forward direction, wherein said rotor features chopping knives 96 that are distributed over the circumference of the rotor 92 and suspended in pendulum fashion. Additional discharge paddles (not-shown) may also be fixed on the rotor 92 or a few or all chopping knives 96 feature paddles for conveying air. Two discharge blowers 100, of which only one is visible in FIG. 1, are arranged laterally adjacent and underneath the chute 86 downstream of an outlet 98 of the straw chopper 60. The discharge blowers 100 feature a number of discharge paddles 102 that can be respectively set in rotation about their rotational axes 108 (that extend about vertically, but are slightly inclined rearward and upward) by one respective hydraulic motor 106, wherein the straw chopper 60 axially feeds the crop residues to said discharge paddles from below at an obtuse angle referred to the rotational axes of the discharge blowers 100.

The rotational axis 110 of the rotor 92 of the straw chopper 60 extends horizontally and transverse to the forward direction. The discharge blowers 100 are arranged laterally adjacent to one another rearward of the straw chopper 60. The discharge blowers 100 are situated within the width of the straw chopper 60. The discharge blowers 100 are mounted on the frame 12 of the combine harvester 10, on the chute 86, or on both by means of brackets (not-shown). It would also be possible to arrange the straw chopper 60 and the discharge blowers 100 in such a way that the straw chopper 60 acts upon the discharge blowers 100 from above. In another embodiment, the rotational axis 108 of the discharge blowers 100 extends horizontally or exactly vertically.

In the windrow depositing position of the flap 80, the straw chopper 60 only transports the crop residues from the cleaning system 28 to the discharge blowers 100 that distribute the crop residues on the field over approximately the width of the cutting unit 18. In the chopping mode, the straw chopper 60 also chops up the straw exiting the outlet 62 of the crop processing device 26 that is thrown against the flap 80 by the ejecting drum 64 and the drum conveyor 68 and subsequently drops down into the inlet 58 of the straw chopper 60.

Figure 2:
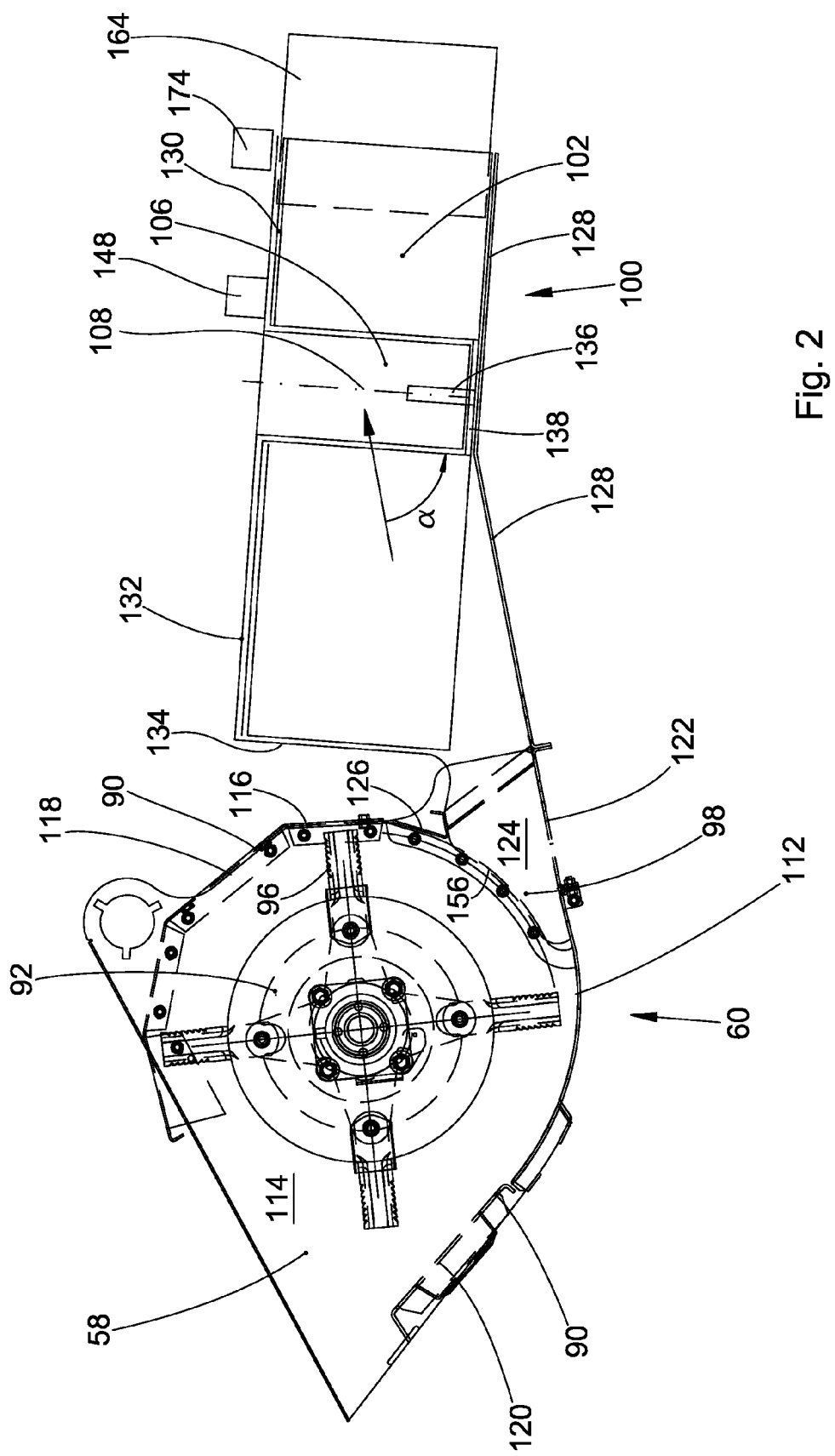
FIG. 2 shows an enlarged side view of a straw chopper and a discharge blower.
Figure 3:
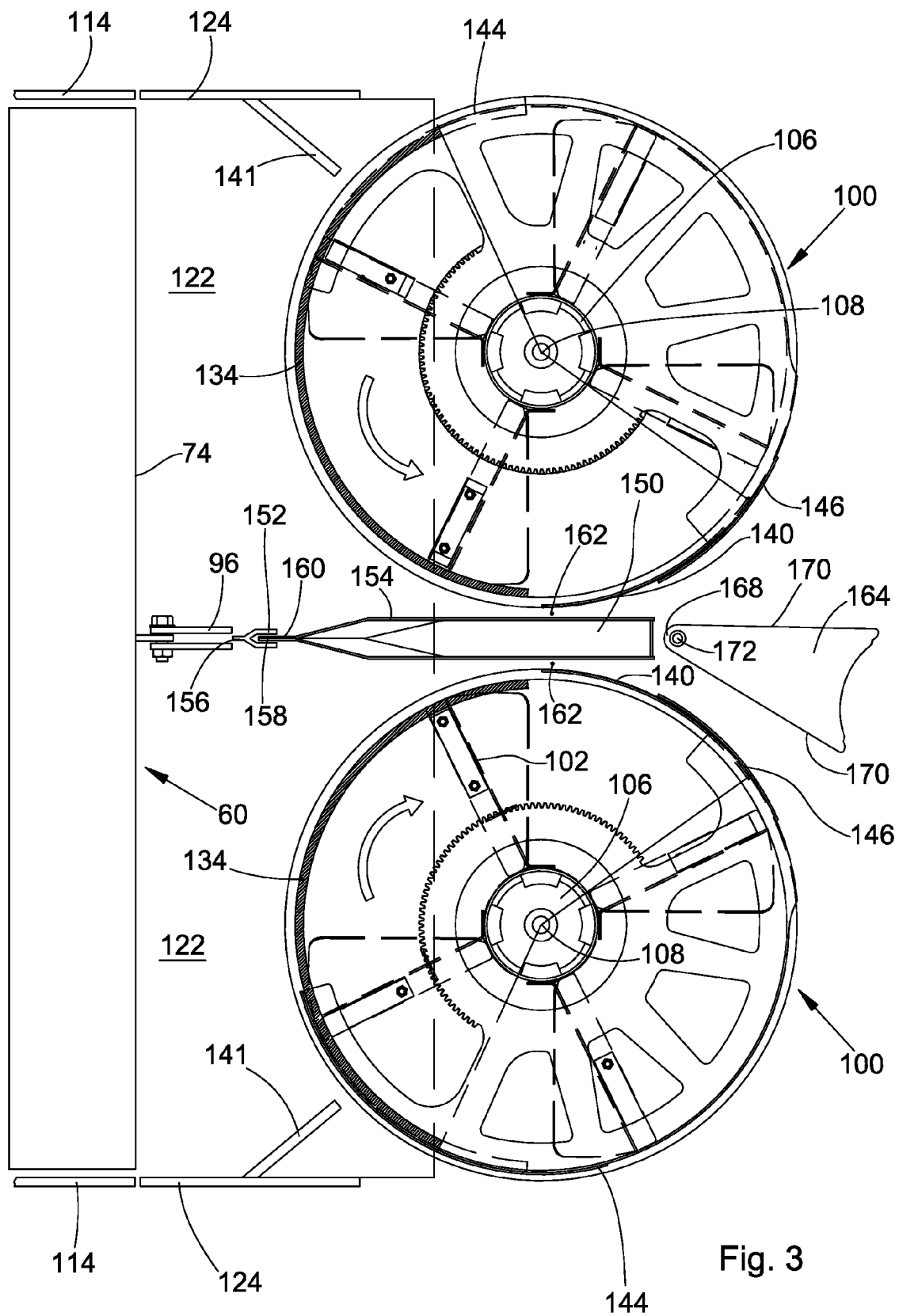
FIG. 3 shows a top view of the straw chopper and the discharge blowers.

The following portion of the description refers to FIGS. 2 and 3, in which the crop residue chopping and distributing arrangement of the combine harvester 10 is illustrated in the form of a side view (FIG. 2) and a top view (FIG. 3). The crop residue chopping and distributing arrangement features a straw chopper 60 and discharge blowers 100. The straw chopper housing 90 features a bottom 112, two side walls 114 and additional transverse plates 116, 118, 120 that connect the side walls 114 to one another analogous to the bottom 112 and enclose the rotor 92. The bottom 112 is arranged on the underside of the straw chopper housing 90 and encloses the enveloping circle defined by the chopping knives 96 in the shape of a circular arc with a radius at a relatively short distance from said enveloping circle. It would also be possible to provide counter knives (not-shown) that are fixed on the straw chopper housing 90 and penetrate into the enveloping circle of the chopping knives 96 in order to effectively chop up the crop residues.

Figure 4:
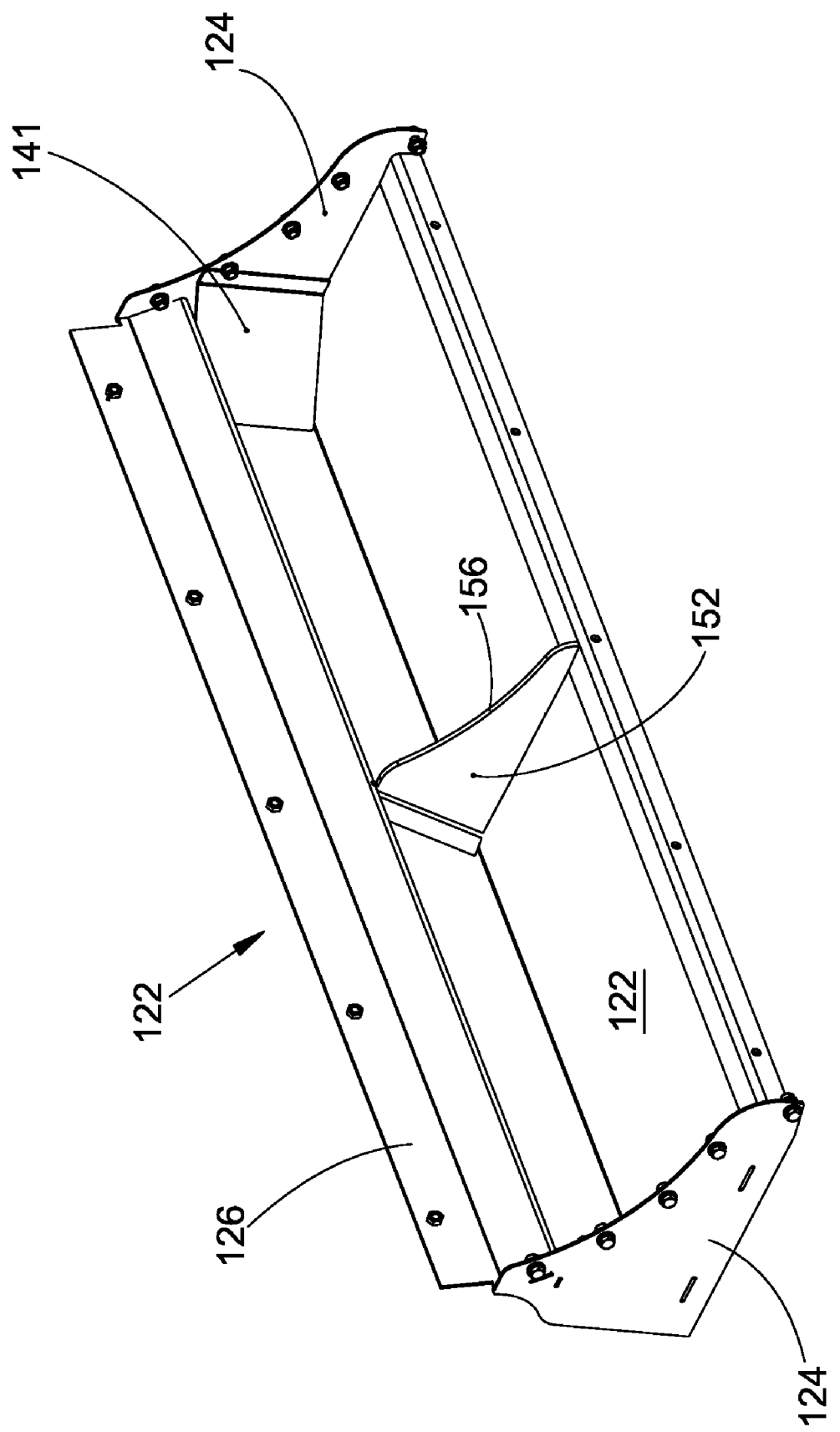
FIG. 4 shows a perspective representation of a crop residue guide element.

A crop residue guide element 122 that is illustrated in the form of a perspective representation in FIG. 4 is arranged adjacent to the bottom 112 in reference to the moving direction of the crop residues. The crop residue guide element 122 is arranged between the side wall extensions 124 that are respectively connected to one side wall 114 of the straw chopper housing 90 with the aid of a screw connection and extends parallel thereto. The crop residue guide element 122 in itself is planar. On its front end, the crop residue guide element 122 is angled downward in order to form a flange that is screwed to a downwardly angled flange on the rear side of the bottom 112. This connection prevents the formation of protruding edges, on which crop residues could accumulate. A transverse plate 126 that defines the top of the outlet 98 of the straw chopper 60 is arranged on the upper side of the side wall extensions 124. The transverse plate 116 of the straw chopper housing 90 is situated upwardly adjacent to the transverse plate 126. It should be noted that the crop residue guide element 122 and the bottom 112, as well as the side wall extensions 124 and the side walls 114, could also be respectively manufactured in one piece. In the two-part embodiment shown, however, the straw chopper 60 can also be used without a crop residue guide element 122 and side wall extensions 124 (or with another not-shown crop residue guide element and other not-shown side wall extensions) in combination with a distributing bottom with adjustable guide plates.

Outer guide elements 141 are fixed on the side wall extensions 124 (see FIG. 4) and extend inward and rearward at an angle of approximately 45°. They are rectangular if viewed from the top and may be curved over the entire length or only in their front region that is situated adjacent to a region that is connected to the side wall extension 124 and extends parallel thereto. The outer guide elements 141 are flat in the vertical direction. It would also be possible to fix the outer guide elements 141 additionally or exclusively on the crop residue guide element 122. They may also be shaped similar to a plough share or a skid.

An angled bottom plate 128 is arranged on the underside of the discharge blowers 100 and extends from a location slightly in front of the rotational axes up to the rear end of the discharge blowers. The bottom plate 128 features a front section that extends in the plane of the crop residue guide element 122 and adjoins a downwardly angled flange of the crop residue guide element 122 with another downwardly angled flange. These flanges may be screwed to one another or merely adjoin one another in order to simplify the transfer of the discharge blowers 100 into a transport position separately of the straw chopper 60. The front section of the bottom plate 128 extends from said flange up to slightly in front of the rotational axis 108 of the discharge blowers 100, at which point it transforms into a rear section that extends underneath the rear end of the discharge blowers 100 and orthogonal to the rotational axis 108.

The bottom output shafts 136 of the hydraulic motors 106 fixed on the cover 132 drive the discharge paddles 102 via a transverse connection 138 and a cylindrical shaft, the upper end of which is fixed on a disk 130 with a central opening. The discharge paddles 102 of the discharge blowers 100 respectively extend over the axial dimension of the cylindrical shaft. The discharge paddles 102 adjoin the disk 130 with their upper sides or are fixed (e.g. welded) thereto.

A cover 132 situated above the disk 130 forms a top cover for the discharge blowers 100, wherein the two partial casings 134 that radially enclose one respective discharge blower 100 semicircularly are arranged on the front side of said cover. Other partial casings 140 follow the adjacent inner sides of the discharge blowers 100, wherein gaps 142 remain between the partial casings 134 and the partial casings 140.

The two-part guide element 150 with a front part 152 and a rear part 154 is situated between the two discharge blowers 100. The front part 152 is fixed on the crop residue guide element 122 and its front point 156 is adapted to the enveloping circle of the chopping knives 96 such that it has the shape of a circular arc over its point 156 that is situated adjacent to the enveloping circle of the chopping knives 96, and this point 165 is arranged a relatively short distance from the enveloping circle of the chopping knives 96. Due to these measures, crop residues accumulating at this location, particularly under moist crop conditions, are removed by the chopping knives 96 such that no undesirable accumulations of crop residues that could possibly lead to clogging occur at the point 156. On its rear side, the front part 152 forms a slot 158, into which a flat front plate 160 of the rear part 154 penetrates. The rear part 154 widens rearward of the front plate 160 and is realized in a hollow fashion. The rear part 154 is fixed on the underside of the cover 132 and on the upper side of the bottom plate 128 that form a discharge blower housing together with the partial casings 134, 140 and the shields 144, 146.

According to FIG. 3, passages 162 respectively exist between the guide element 150 and the adjacent partial casings 134, 140 of the discharge blowers 100, wherein part of the crop residue stream delivered from the central region of the straw chopper 60 can extend rearward from the straw chopper 60 as far as the field through said passages.

A movable guide element 164 is provided rearward of the rear part 154 of the guide element 150 and features a front point 168 that is situated between the discharge blowers 100 rearward of their rotational axes 108, as well as two diverging, straight side walls 170 that are respectively arranged adjacent to a discharge blower 100. The movable guide element 164 can carry out an oscillatory motion about a front axis 172 that extends parallel to the rotational axis 108 of the discharge blowers 100, namely with the aid of a drive 174 that is arranged above the cover 132 and rearward of the hydraulic motors 106. In this respect, we refer to DE 10 2007 037 485 B3 and DE 10 2008 055 003 A1, the disclosure of which is hereby incorporated into the present document by reference.

Figure 5:
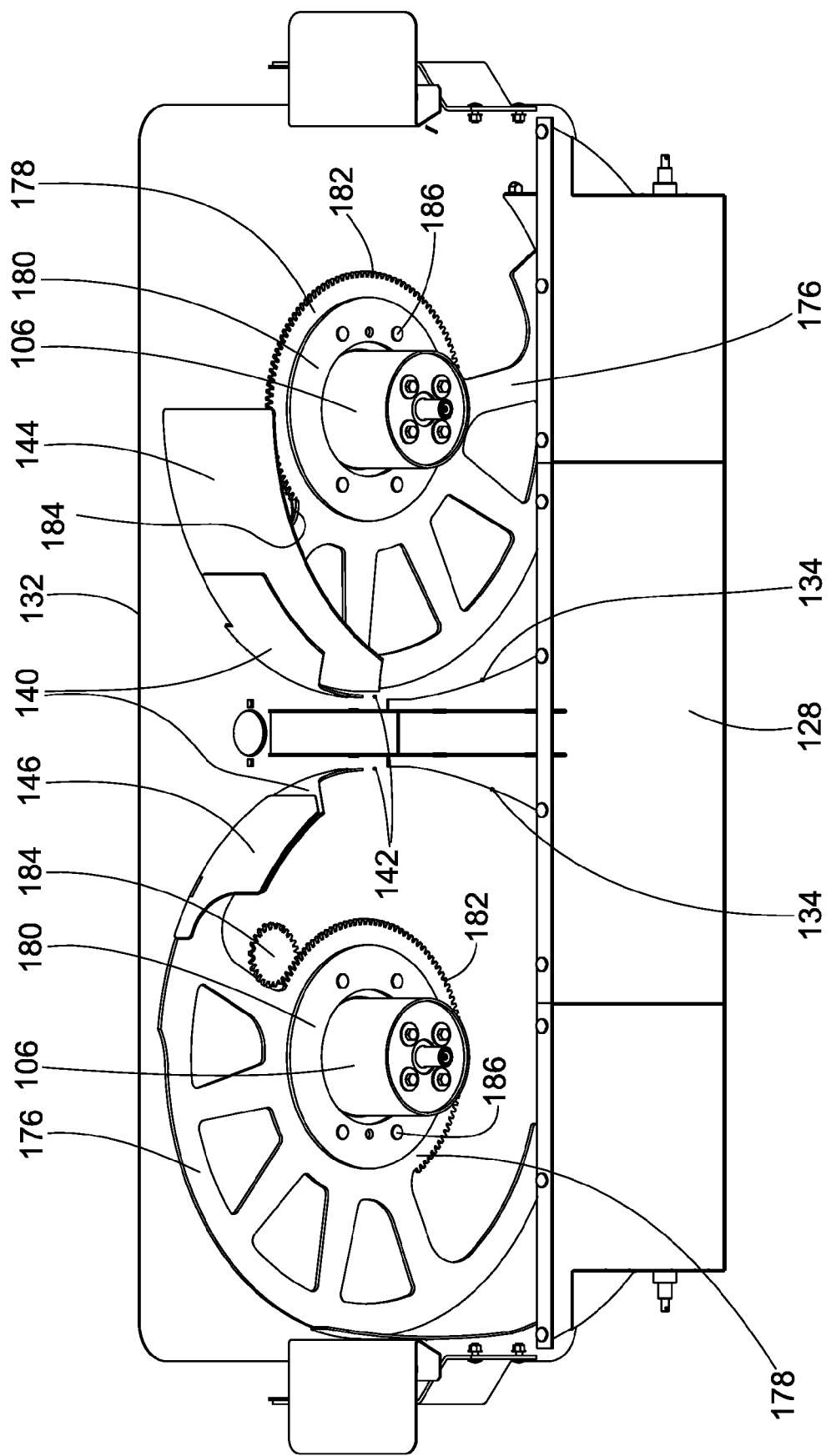
FIG. 5 shows a perspective representation of the discharge blowers with removed rotary disks and discharge paddles, wherein a longer shield is in an active position on the right discharge blower and a shorter shield is in an active position on the left discharge blower.
Figure 6:
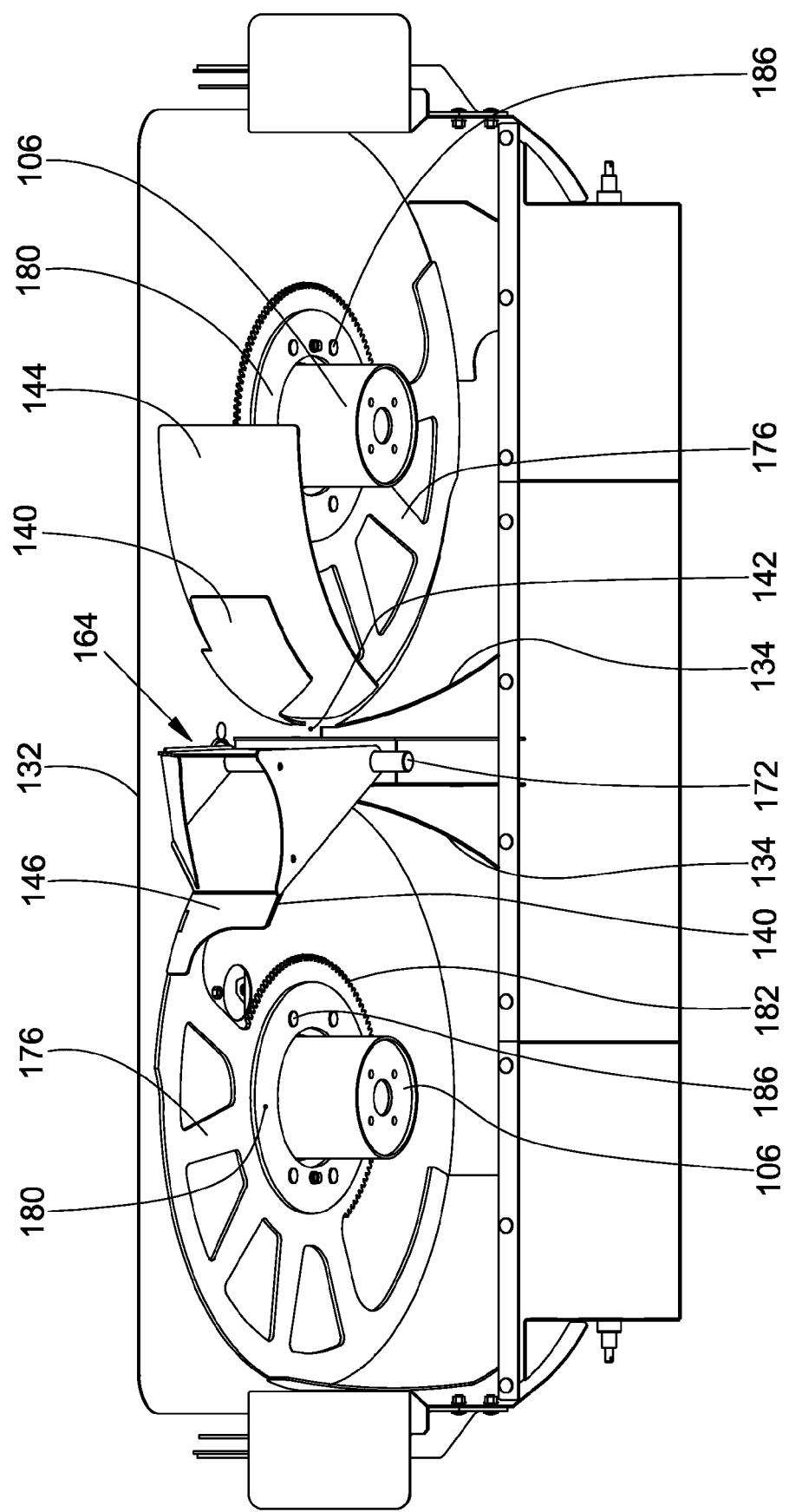
FIG. 6 shows the illustration according to FIG. 5, wherein the shorter shield on the left discharge blower is displaced into an additionally retracted position.
Figure 7:
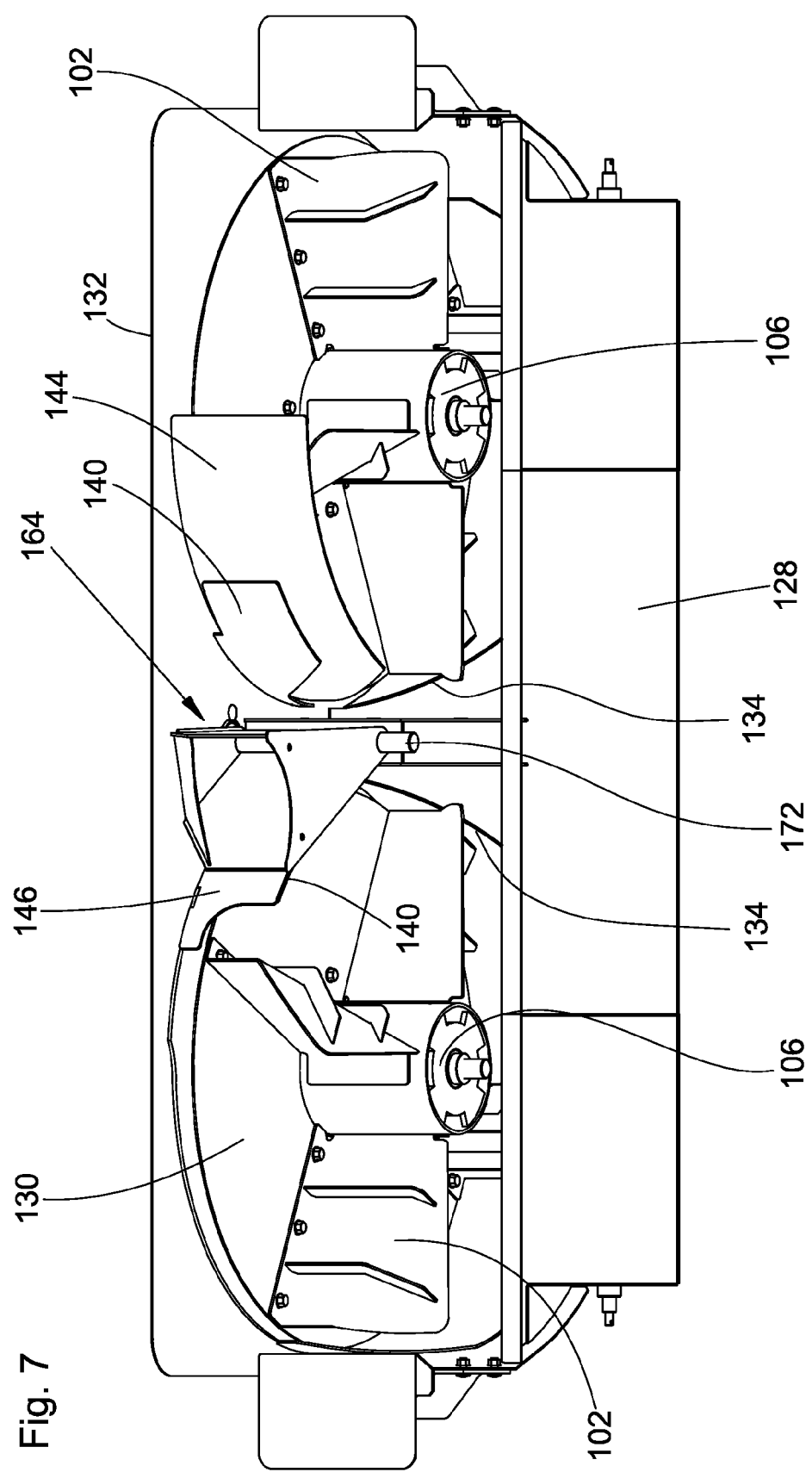
FIG. 7 shows the illustration according to FIG. 6 with installed rotary disks and discharge paddles.

According to FIGS. 5 to 7, the partial casings 140 feature a higher rear section and a lower front section, between which an obliquely ascending region is provided.

On their rear ends, the partial casings 140 may be selectively extended with shorter or longer angled sections by positioning first and second shields 144, 146 with different dimensions in the circumferential direction on the rear ends of the partial casings 140 with the aid of an adjusting drive 148 that is controlled manually by the operator from the cabin 16 or automatically in dependence on the position of the flap 68. This deflects the crop residues outward to a greater or lesser extent due to the fact that the shields cover the discharge blowers 100 and prevent the free radially outward delivery of the crop residues such that the crop residues can only exit the discharge blowers 100 after they have passed the shields 144 or 146. Due to these measures, chaff can be deposited laterally adjacent to the windrow in the windrow depositing mode by displacing the first, longer shield 144 against the rear inner end of the partial casing 140 or the crop residues can be evenly distributed over the field in the straw chopping mode by displacing the second, shorter shield 146 against the rear inner end of the partial casing 140. In addition, the shields 144, 146 of both discharge blowers 100 can be adjusted independently of one another in order to compensate the influences of cross winds and/or slopes.

The shields 144, 146 are respectively fixed jointly and diametrically opposite of one another on approximately semi-circular rotary brackets 176 positioned between the cover 132 and the disks 130. The rotary brackets 176 feature a central region 178 with a central opening, through which the corresponding rotational axis 108 of the respective discharge blower 100 extends. In reference to the axial direction, the central region 178 is supported, particularly in a sliding fashion, between the cover 132 and a retaining disk 180 connected to the cover 132. In the radial direction, the central opening of the central region 178 adjoins mounting elements 186 in the form of threaded fasteners that are connected to the cover 132 and/or the retaining disk 180 and therefore is radially fixed. The outside of the central region 178 is provided with gear teeth 182 that extend over part of its circumference and mesh with a gear wheel 184 coupled to the drive 148.

The first, longer shields 144 have an approximately rectangular shape with an angled lower front corner. They can be positioned radially inside the partial casings 140. This prevents the formation of undesirable edges, on which relatively small crop residues could get caught when the first shields 144 are in their active position on the inner side of the partial casings because chaff that may be particularly critical in this respect is transported in this configuration. The first shields 144 are significantly longer than the partial casings 140 referred to the radial direction of the axes 108 of the discharge blowers 100.

The second, shorter shields 146 also have an approximately rectangular shape with a recessed lower rear corner. They can be positioned radially outside the partial casings 140. The dimensions of the second shields 146 in the radial direction of the axes 108 of the discharge blowers 100 approximately correspond to the dimensions of the partial casings 140 in the radial direction of the axes 108 of the discharge blowers 100.

In FIG. 5, the second shield 146 on the discharge blower 100 illustrated on the left is in the active position, in which it is situated rearwardly adjacent to the partial casing 140. On the discharge blower 100 illustrated on the right, the first shield 144 is in the active position, in which it is situated rearwardly adjacent to the partial casing 140. In FIG. 6 that also shows the guide element 164, the position of the shield 144 on the right discharge blower 100 is not changed in comparison with FIG. 5, but the position of the shield 146 on the left discharge blower 100 was changed in comparison with FIG. 5 in the clockwise direction such that more crop residues are deposited on the field in the vicinity of the central longitudinal plane of the combine harvester 10. Due to these measures, the influences of cross winds and slopes can be compensated by the operator or automatically in order to distribute the crop residues over the field as evenly as possible. In FIG. 7, the position of the shields 144, 146 was not changed in comparison with FIG. 6, but the disks 130 and the discharge paddles 102 are also illustrated in this figure. In contrast to FIGS. 5 to 7, the first shields 144 can also be displaced into a position, in which they directly adjoin the partial casings 134 so as to close the gaps 142 and to ensure that the crop residues can only be discharged outward.

According to the preceding description, the crop residue chopping and distributing arrangement functions as described below in the harvesting mode. The crop residues consisting of chaff and, in the position of the flap 80 illustrated in FIG. 1, of straw are admitted into the straw chopper 60 through the inlet 58, chopped up therein by the chopping knives 96, if applicable, in cooperation with counter knives (not-shown) and ejected through the outlet 98. The crop residues are conveyed along the crop residue guide element 122 and impact on the discharge paddles 102 of the discharge blowers 100 at an angle α of approximately 55° in reference to the rotational axis 108 of said blowers. The outer guide elements 141 guide the outer parts of the crop residue stream inward such that the very outer parts of the discharge blowers 100 are not acted upon with crop residues and these crop residues also do not have to be deflected forward by nearly 180°. The relatively large angle alpha (α) and the point of impact of the crop residues in front of the rotational axis 108 of the discharge blowers 100 additionally lowers their energy requirement. Due to these measures, the speed of the crop residues generated with the aid of the straw chopper 60 is used in the best possible fashion because a significant deflection no longer takes place downstream of the straw chopper 60 and the discharge blowers 100 in essence additionally transport the crop residues in their already existing direction of motion.

Figure 8:
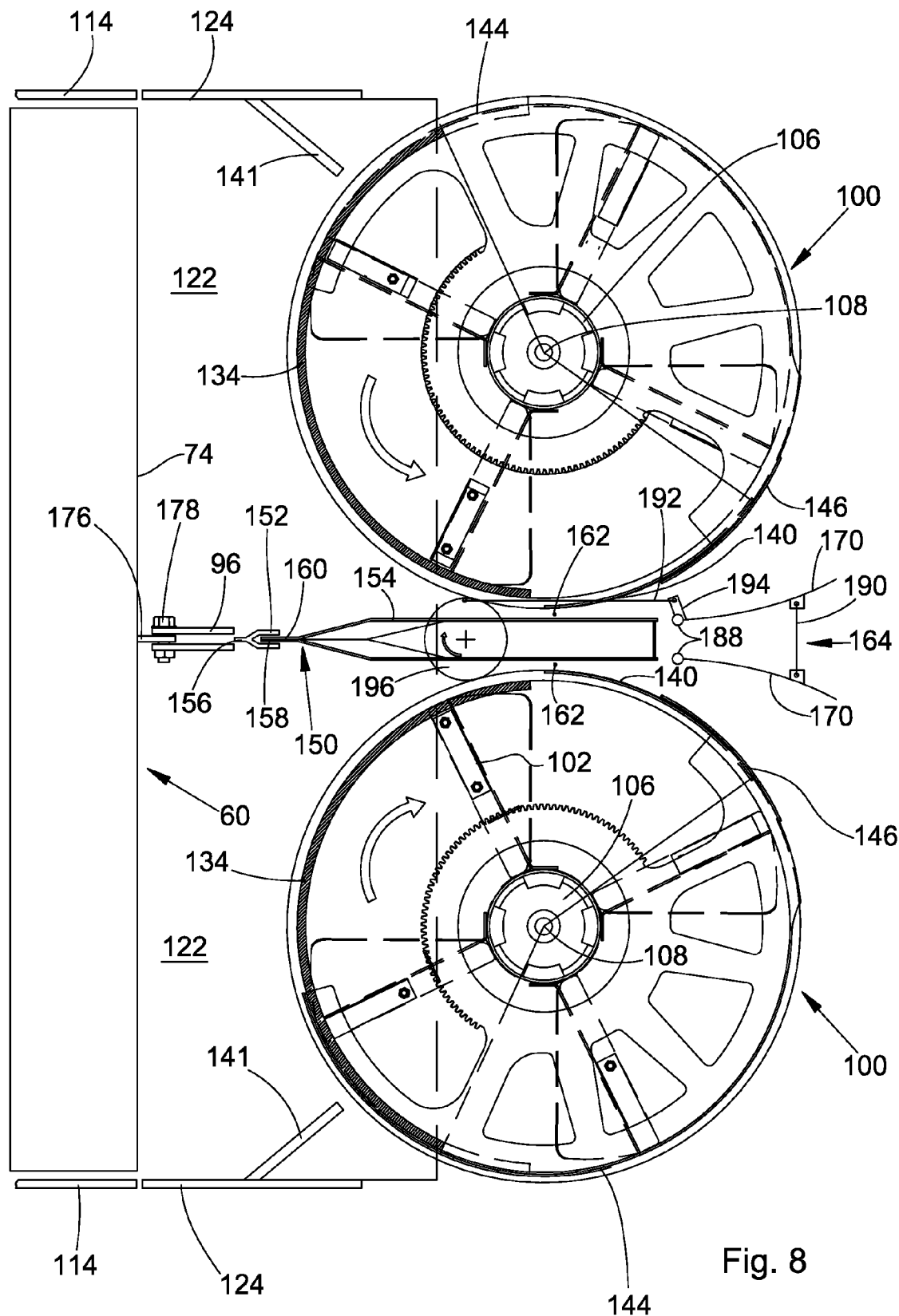
FIG. 8 shows a top view of the discharge blowers similar to FIG. 3, however, with another embodiment of a guide element.

We ultimately refer to FIG. 8, in which an embodiment is illustrated that basically corresponds to the embodiment according to FIGS. 2 to 5. In contrast to the aforementioned embodiment, the movable guide element 164 is composed of two walls 170 that are supported directly rearward of the rear part 154 of the guide element 150 such that they can be separately pivoted about hinge pins 188. The hinge pins 188 extend parallel to the rotational axes of the discharge blowers 100. The respective walls 170 are concavely curved with a diameter that approximately corresponds to the diameter of the discharge blowers 100 and the diameter of the guide elements 141, respectively. The walls 170 are connected to one another by a coupling rod 190 that is coupled to said walls 170. A connecting rod 192 connects a pin 194 that is connected to one of the walls 170 and pivots about the hinge pin 188 with the wall 170 to a driving wheel 196 that can be set in rotation with the aid of the drive 174. The connecting rod 192 is connected eccentrically to the center of rotation of the driving wheel 196. The function of the guide element 164 in FIG. 11 corresponds to that of the guide element 164 in FIG. 3.

The invention claimed is:

1. A crop residue chopping and distributing arrangement for a combine harvester, comprising:
    a straw chopper (60) that is equipped with chopping knives (96),
    two discharge blowers (100), each said blower having a rotational axis (108), and wherein said blowers are arranged laterally adjacent to one another downstream of the straw chopper (60) and rotate in opposite directions during operation, such that regions of the two discharge blowers (100) that face the straw chopper (60) move toward each other during operation and
    a guide element (150) having a point (156) that faces the straw chopper (60), wherein said guide element (150) is arranged between said discharge blowers and is situated in front of the rotational axis (108) of the two discharge blowers (100),
    wherein two free passages (162) remain in the lateral direction between the guide element (150) and the two discharge blowers (100), respectively, and a crop residue stream delivered from the central region of the straw chopper (60) can extend rearward from the straw chopper (60) as far as the field through said two free passages wherein the discharge blowers (100) are each enclosed by partial casings (134, 140), and between each said partial casings (134, 140) a gap is (142) provided, each said gap (142) being situated adjacent to the guide element (150) and between the respective discharge blower (100) and the guide element (150).

2. The crop residue chopping and distributing arrangement according to claim 1, wherein the guide element (150) extends behind the rotational axes (108) of the discharge blowers (100).

3. The crop residue chopping and distributing arrangement according to claim 2, wherein a movable guide element (164) is situated adjacent to the rear end of the guide element (150) and can be continuously moved about an axis (172) extending parallel to the rotational axes (108) of the discharge blowers (100) during operation.

4. The crop residue chopping and distributing arrangement according to claim 1, wherein the guide element (150) is composed of a front part (152) and a rear part (154), wherein the front part (152) having the point (156) is fixed on a crop residue guide element (122) that forms part of a straw chopper housing (90) accommodating the straw chopper (60), or the front part (152) is connected to the crop residue guide element (122), and the rear part (156) is fixed on a discharge blower housing accommodating the discharge blowers (100).

5. The crop residue chopping and distributing arrangement according to claim 4, wherein the rear side of the front part (152) contains a slot (158), into which the rear part (154) extends.

6. The crop residue chopping and distributing arrangement according to claim 1, wherein the rotational axes (108) of the discharge blowers (100) are arranged within the width of the straw chopper (60), wherein outer guide elements (141) are provided between the straw chopper (60) and the discharge blowers (100) and deflect the outer regions of the crop residue stream inward.

7. The crop residue chopping and distributing arrangement according to claim 6, wherein the discharge blowers (100) are arranged within the width of the straw chopper (60).

8. The crop residue chopping and distributing arrangement according to claim 6, wherein the outer guide elements (141) adjoin a lateral wall of a straw chopper housing (90) or a side wall extension (124) connected thereto.

9. The crop residue chopping and distributing arrangement according to claim 1, wherein the straw chopper (60) axially acts upon the discharge blower (100) at an angle ($\alpha$) during operation.

10. The crop residue chopping and distributing arrangement according to claim 1, further comprising a straw chopper housing (90) having a concave bottom (112), in said housing the straw chopper (60) is arranged, wherein the straw chopper housing (90) and a crop residue guide element (122) arranged between the bottom (112) of the straw chopper housing (90) and the discharge blowers (100) are arranged in such a way that the chopper (60) projects chopped material to impact the discharge blower (100) at an angle ($\alpha$) of approximately 55 degrees with respect to the rotational axis (108) of the two discharge blowers (100) during the operation, and further wherein the crop residue guide element (112) is flat.

11. The crop residue chopping and distributing arrangement according to claim 1, wherein the crop residue stream is introduced in front of the rotational axes (108) of the discharge blowers (100).

12. A combine harvester (10) with a crop residue chopping and distributing arrangement according to claim 1.

* * * * *